(12) United States Patent
Takeda et al.

(10) Patent No.: US 12,069,003 B2
(45) Date of Patent: Aug. 20, 2024

(54) USER TERMINAL AND BASE STATION

(71) Applicant: NTT DOCOMO, INC., Tokyo (JP)

(72) Inventors: Kazuki Takeda, Tokyo (JP); Shohei Yoshioka, Tokyo (JP); Satoshi Nagata, Tokyo (JP); Shaozhen Guo, Beijing (CN); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 731 days.

(21) Appl. No.: 17/257,728

(22) PCT Filed: Jul. 6, 2018

(86) PCT No.: PCT/JP2018/025780
§ 371 (c)(1),
(2) Date: Jan. 4, 2021

(87) PCT Pub. No.: WO2020/008644
PCT Pub. Date: Jan. 9, 2020

(65) Prior Publication Data
US 2021/0273771 A1    Sep. 2, 2021

(51) Int. Cl.
*H04W 4/00* (2018.01)
*H04L 5/00* (2006.01)
*H04W 72/0446* (2023.01)
*H04W 72/0453* (2023.01)
*H04W 72/1263* (2023.01)
*H04W 72/23* (2023.01)

(52) U.S. Cl.
CPC ....... *H04L 5/0098* (2013.01); *H04W 72/0446* (2013.01); *H04W 72/0453* (2013.01); *H04W 72/1263* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2011/0134774 A1* | 6/2011 | Pelletier | H04W 76/15 370/242 |
| 2019/0045491 A1* | 2/2019 | Zhang | H04W 72/232 |
| 2019/0103954 A1* | 4/2019 | Lee | H04L 5/0098 |
| 2019/0149380 A1* | 5/2019 | Babaei | H04W 72/0446 370/330 |
| 2019/0215117 A1* | 7/2019 | Lee | H04L 5/0048 |

OTHER PUBLICATIONS

Office Action issued in the counterpart Japanese Patent Application No. 2020-528665, mailed on Jul. 5, 2022 (6 pages).
(Continued)

*Primary Examiner* — Zewdu A Beyen
(74) *Attorney, Agent, or Firm* — Osha Bergman Watanabe & Burton LLP

(57) ABSTRACT

A user terminal according to one aspect of the present disclosure includes: a receiving section that receives downlink control information using a certain downlink control information format; and a control section that determines activation or deactivation of a secondary cell, based on the downlink control information. According to one aspect of the present disclosure, it is possible to control activation at higher speed.

6 Claims, 21 Drawing Sheets

ACTIVATION DCI

| CIF | FREQUENCY DOMAIN RA | TIME DOMAIN RA | MCS | RV | NDI | OTHERS |
|---|---|---|---|---|---|---|
| 001 | ALL 1 | 1111 | 11111 | 11 | 1 | ... |

(56) References Cited

OTHER PUBLICATIONS

3GPP TSTs 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
3GPP TSG RAN WG1 Meeting 91; R1-1720826 "Remaining issues on other aspect of carrier aggregation" NTT DOCOMO, INC.; Reno, USA; Nov. 27-Dec. 1, 2017 (10 pages).
International Search Report issued in International Application No. PCT/JP2018/025780, mailed Sep. 18, 2018 (5 pages).
Written Opinion issued in International Application No. PCT/JP2018/025780; Dated Sep. 18, 2018 (4 pages).
Extended European Search Report issued in Application No. 18925628.2 mailed on Jan. 19, 2022 (13 pages).
MediaTek Inc., "Summary of Offline Discussion on Bandwidth Part Operation", 3GPP TSG RAN WG1 Meeting NR#3, R1-1716832, Nagoya, Japan, Sep. 18-21, 2017 (7 pages).
Qualcomm Incorporated, "Open Issues on CA", 3GPP TSG RAN WG1 #90bis, R1-1718581, Prague, Czech Republic, Oct. 9-13, 2017 (10 pages).
Office Action issued in the counterpart European Application No. 18925628.2, mailed Aug. 28, 2023 (7 pages).
Office Action issued in counterpart Chinese Patent Application No. 201880097211.8 mailed on Jun. 12, 2023 (12 pages).

* cited by examiner

SCell ACTIVATION/DEACTIVATION MAC CE

OCTET 1

SCell ACTIVATION/DEACTIVATION MAC CE

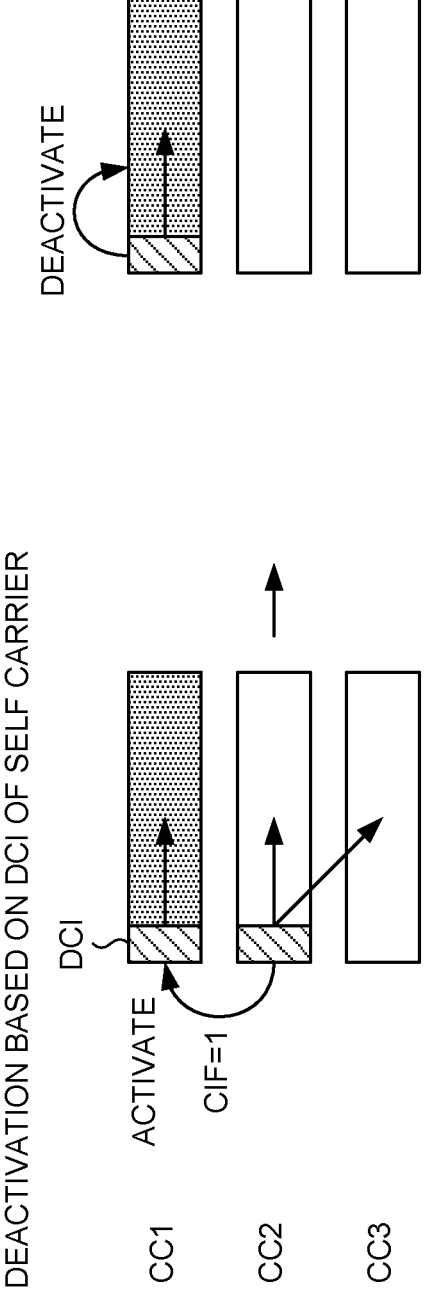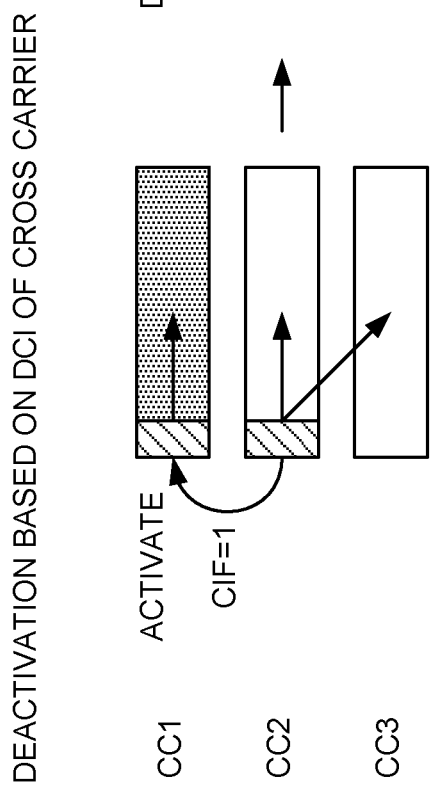

FIG. 4B ACTIVATION DCI

| CIF | FREQUENCY DOMAIN RA | TIME DOMAIN RA | MCS | RV | NDI | OTHERS |
|---|---|---|---|---|---|---|
| 001 | ALL 1 | 1111 | 11111 | 11 | 1 | ... |

FIG. 4C DEACTIVATION DCI

| CIF | FREQUENCY DOMAIN RA | TIME DOMAIN RA | MCS | RV | NDI | OTHERS |
|---|---|---|---|---|---|---|
| 001 | ALL 0 | 0000 | 00000 | 00 | 0 | ... |

| CIF | SCell ACTIVATION/ DEACTIVATION INDICATOR | FREQUENCY DOMAIN RA | TIME DOMAIN RA | MCS | RV | NDI | OTHERS |
|---|---|---|---|---|---|---|---|
| 001 | 0/1 (1 bit) | ... | ... | ... | ... | ... | ... |

FIG. 5

| BITMAP | $c_1$ | $c_2$ | $c_3$ | $c_4$ | $c_5$ | $c_6$ | $c_7$ | $c_8$ |
|---|---|---|---|---|---|---|---|---|
| VALUE | 1 | 1 | 1 | 1 | 0 | 0 | 0 | 0 |

FIG. 8

| DCI CONTENTS | BWP INDICATOR | | SCell ACTIVATION/ DEACTIVATION INDICATOR | BWP INDICATOR | | SCell ACTIVATION/ DEACTIVATION INDICATOR |
|---|---|---|---|---|---|---|
| VALUE | 1 | 0 | 1 | 0 | 1 | 1 |

| DCI CONTENTS | SCell ACTIVATION/DEACTIVATION INDICATOR | | | | | | | | | | | | | | | |
|---|---|---|---|---|---|---|---|---|---|---|---|---|---|---|---|---|
| BWP INDEX | 0 | 1 | 2 | 3 | 0 | 1 | 2 | 3 | 0 | 1 | 2 | 3 | 0 | 1 | 2 | 3 |
| BITMAP | 0 | 1 | 1 | 0 | 1 | 0 | 1 | 0 | 1 | 1 | 0 | 0 | 0 | 0 | 1 | 1 |
| | CC1 | | | | CC2 | | | | CC3 | | | | CC4 | | | |

FIG. 10

USER TERMINAL AND BASE STATION

TECHNICAL FIELD

The present disclosure relates to a user terminal and a base station in next-generation mobile communication systems.

BACKGROUND ART

In UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In carrier aggregation (CA) of existing LTE (for example, LTE Rel. 13), a base station performs control on a user terminal (UE (User Equipment)) by using a MAC control element (MAC CE (Medium Access Control Control Element)), in order to activate a secondary cell (SCell) in a deactive state.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In existing LTE, activation of an SCell requires several tens of milliseconds. In future radio communication systems (for example, NR), more rapid activation/deactivation control of SCell is desired. Unless a method to appropriately execute such control is established, problems such as reduction of throughput occurs.

Thus, an object of the present disclosure is to provide a user terminal and a base station that can control activation of a secondary cell at higher speed.

Solution to Problem

A user terminal according to one aspect of the present disclosure includes: a receiving section that receives downlink control information using a certain downlink control information format; and a control section that determines activation or deactivation of a secondary cell, based on the downlink control information.

Advantageous Effects of Invention

According to one aspect of the present disclosure, it is possible to control activation of a secondary cell at higher speed.

BRIEF DESCRIPTION OF DRAWINGS

FIGS. 3A and 3B are diagrams to show examples of SCell deactivation of a self carrier and a cross carrier, respectively;

FIGS. 4A to 4C are diagrams to show examples of SCell activation DCI and SCell deactivation DCI;

FIG. 5 is a diagram to show an example of DCI including an SCell activation/deactivation indicator field;

FIG. 8 is a diagram to show an example of an SCell activation/deactivation indicator field according to an aspect 2-1;

FIG. 9 is a diagram to show an example of an SCell activation/deactivation indicator field according to an aspect 2-2;

FIG. 10 is a diagram to show an example of an SCell activation/deactivation indicator field according to an aspect 2-3;

DESCRIPTION OF EMBODIMENTS

In carrier aggregation (CA) of existing LTE (for example, LTE Rel. 13), signaling (Activation/Deactivation MAC CE) using a MAC control element (MAC CE (Medium Access Control Control Element)) is used to activate an SCell in a deactivated state. The MAC CE contains information relating to whether to activate each SCell.

Note that, in a deactive cell, there is less operations performed by the UE than the operations in an active cell, for example, the UE does not monitor a downlink control channel (e.g., PDCCH (Physical Downlink Control Channel)) and does not transmit an uplink control channel (PUCCH (Physical Uplink Control Channel)).

The UE that has received an activation MAC CE at a certain subframe (subframe n), the UE need to transmit effective CSI reporting by a subframe n+24 or n+34. Here, the effective CSI is CSI that is obtained based on measurement of the UE, and the effective CSI corresponds to a CQI value including a CQI index=0 (corresponding to OOR (Out Of Range)) and others.

In NR, in a case that an SCell with a MAC entity of 1 or greater is configured, the network may activate or deactivate the configured SCell. The SCell may be deactivated in accordance with the configuration of the SCell.

The configured SCell may be activated or deactivated in accordance with reception of an SCell activation/deactivation MAC CE. The configured SCell (excluding an SCell configured by using a PUCCH) may be activated or deactivated in accordance with configuration of a timer of each configured SCell (sCellDeactivationTimer). In accordance with expiration of the timer, an associated SCell may be deactivated.

To each SCell index (sCellIndex) that is included in an additional modification SCell list (sCellToAddModList) and that is not a part of the current UE configuration (SCell Addition), the UE may add an SCell that corresponds to the SCell index, in accordance with SCell common configuration (SCellConfigCommon) and SCell dedicated configuration (SCellConfigDedicated). Moreover, the UE may configure a lower layer in such a manner that the lower layer recognizes making the SCell in a deactivated state. Furthermore, with respect to each measurement ID (measId) included in a measurement ID list (measIdList) of measurement configuration variable (VarMeasConfig), in a case that a SCell is not applicable to associated measurement, and in a case that an associated SCell is included in a list of cells to be triggered (cellsTriggeredList) defined in a variable measurement report list (VarMeasReportList) for the measurement ID, the UE may delete the associated SCell from the list of cells that are to be triggered and that are defined in the variable measurement report list for the measurement ID.

The UE may modify SCell configuration to each SCell index that is contained in an additional modification SCell list and that is a part of the current UE configuration (SCell modification), in accordance with SCell dedicated configuration.

Figure 1A:
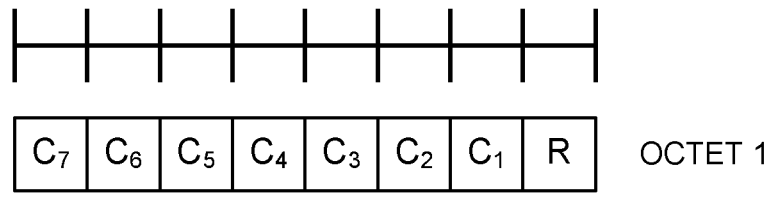
FIGS. 1A and 1B are diagrams to show examples of an SCell activation/deactivation MAC CE.
Figure 1B:
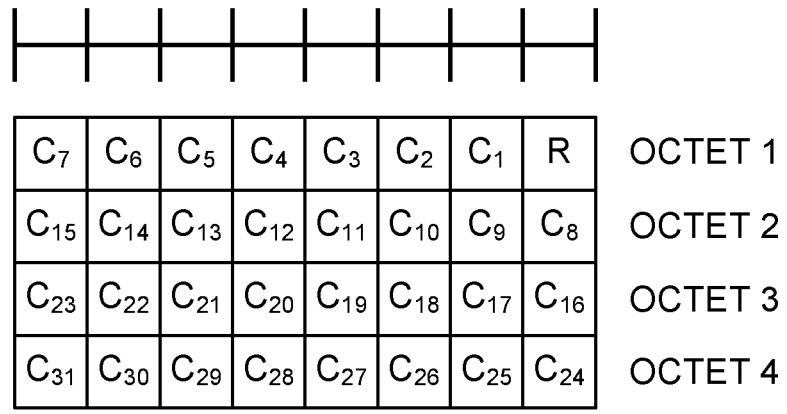

In a case that there is no serving cell that has a serving cell index (ServCellIndex) greater than 7, an SCell activation/deactivation MAC CE of 1 octet may be used, as shown in FIG. 1A. Otherwise, an SCell activation/deactivation MAC CE of 4 octets may be used, as shown in FIG. 1B.

In a case that there is an SCell that is configured to a MAC entity by using $C_i$ (SCell index (SCellIndex) i), the $C_i$ field may indicate the state of activation or deactivation of the SCell having the SCell index i. Otherwise, the MAC entity may ignore the $C_i$ field. The $C_i$ field may be set to "1" in order to indicate that the SCell having the SCell index i is activated. The $C_i$ field may be set to "0" in order to indicate that the SCell having the SCell index i is deactivated.

The symbol "R" represents a reserve bit and is set to "0."

Next, the time from a MAC CE to SCell activation/deactivation will be described. In a case that SCell activation/deactivation is based on a MAC CE, most of corresponding operations (except for CSI reporting) may be performed before the minimum requirement (slot n+K) and after certain timing (for example, slot n+k of the cell in which the activation command for SCell is received, the SCell to be activated, or the cell for performing CSI reporting).

In a case that the UE receives an activation command for SCell at a slot n of a certain cell, a corresponding operation, except for the following operations 1 to 3, may be applied before the minimum requirement and after certain timing (for example, slot n+k of the certain cell, the SCell to be activated, or the cell for performing CSI reporting).

(Operation 1) Operation relating to CSI reporting to a serving cell, the operation which is activated at the certain timing (for example, slot n+k of the cell in which the activation command for SCell is received, the SCell to be activated, or the cell for performing CSI reporting).

(Operation 2) Operation relating to SCell deactivation timer (sCellDeactivationTimer) associated with the SCell to be activated at the certain timing (for example, slot n+k of the cell in which the activation command for SCell is received, the SCell to be activated, or the cell for performing CSI reporting).

(Operation 3) Operation relating to CSI reporting in a serving cell that is not active at certain timing (for example, slot n+k of the cell in which the activation command for SCell is received, the SCell to be activated, or the cell for performing CSI reporting).

The operations 1 and 2 can be applied, for example, at the certain timing (for example, slot n+k of the cell in which the activation command for SCell is received, the SCell to be activated, or the cell for performing CSI reporting). The operation 3 can be applied at a first slot after the certain timing (for example, slot n+k of the cell in which the activation command for SCell is received, the SCell to be activated, or the cell for performing CSI reporting).

In a case that the UE may receive a deactivation command for SCell, or an SCell deactivation timer associated with the SCell may expire at a slot n, a corresponding operation that is applied at certain timing (for example, slot n+k of the cell in which the activation command for SCell is received, the SCell to be activated, or the cell for performing CSI reporting), except for the operations relating to CSI reporting in an active serving cell, may be applied before the minimum requirement.

In a case of multiplexing of CSI reporting on the PUSCH, rate matching is performed. Thus, timing of SCell activation is fixed so that the PUSCH will be appropriately received.

In a case that the SCell is activated, any of the following operations 1 to 5 may be applied.

(Operation 1-1) SRS (Sounding Reference Signal) transmission on the SCell
(Operation 1-2) CSI reporting for the SCell
(Operation 1-3) PDCCH monitoring on the SCell
(Operation 1-4) PDCCH monitoring for the SCell
(Operation 1-5) PUCCH transmission on the SCell (in the case that it is configured)

In a case that the SCell is deactivated, any of the following operations 6 to 12 may be applied.

(Operation 1-6) The UE does not transmit SRS on the SCell.

(Operation 1-7) The UE does not transmit CSI for the SCell.

(Operation 1-8) The UE does not transmit a UL-SCH (UL data, UL transport channel) on the SCell.

(Operation 1-9) The UE does not transmit a RACH (random access channel) on the SCell.

(Operation 1-10) The UE does not monitor a PDCCH on the SCell.

(Operation 1-11) The UE does not monitor a PDCCH for the SCell.

(Operation 1-12) The UE does not transmit a PUCCH on the SCell.

On the basis of a current mechanism of SCell activation/deactivation, activation delay is large, which may limit a utilization rate of spectrum.

In view of this, the inventors of the present invention came up with a method for controlling activation/deactivation of SCell at high speed. Specifically, the inventors of the present invention came up with design of DCI and UE operations for SCell activation/deactivation based on downlink control information (DCI).

Embodiments according to the present disclosure will be described in detail with reference to the drawings, hereinafter. The radio communication method according to each embodiment may be employed independently or may be employed in combination.

In the following description, the terms relating to the active state (activated state) (for example, "activation (activate)," and "active") may be interpreted as the terms relating to the deactive state (deactivated state) (for example, "deactivation (deactivate)," "deactive," "inactive," and "release"). The phrase "SCell activation/deactivation" may be interpreted as "at least one of activation and deactivation of SCell." The phrase "activate/deactivate" may be interpreted as "at least one of activate and deactivate."

The cell may be interpreted as a "CC (Component Carrier)."

Non-fall back DCI may be, for example, DCI that is transmitted in a UE-SS (UE-specific Search Space) or DCI that can be configured (contents, payload, and so on) by higher layer signaling (for example, RRC signaling) specific to the UE. The non-fall back DCI may be CRC (Cyclic Redundancy Check) scrambled by a C-RNTI. The non-fall back DCI may be used after RRC is connected.

Fall back DCI may be, for example, DCI that is transmitted in at least one of a C-SS (Common Search Space) and a UE-SS, or DCI that cannot be configured by higher layer signaling specific to the UE. Note that, also in the fall back DCI, the fall back DCI can be configured (contents, payload, and so on) by higher layer signaling common to UEs (for example, broadcast information and system information). The fall back DCI may be used before RRC is connected.

(First Aspect)

To indicate SCell activation/deactivation, the non-fall back DCI (certain DCI format, for example, DCI format 0_1 or 1_1) may be used (reused). The UE may recognize SCell activation/deactivation based on the non-fall back DCI.

To indicate SCell activation/deactivation, at least one of DL assignment (for example, DCI format 1_1) and UL grant (for example, DCI format 0_1) may be used.

<Paired Spectrum/Unpaired Spectrum>

As to SCell activation/deactivation in paired spectrum, DL assignment may be used for DL SCell activation/deactivation, and UL grant may be used for UL SCell activation/deactivation. In other words, in the paired spectrum, one of a DL SCell and a UL SCell may be activated by one DCI.

The paired spectrum may use a DL band and a UL band and may be used for FDD (Frequency Division Duplex).

As to SCell activation/deactivation in unpaired spectrum, at least one of DL assignment and UL grant may be used for the SCell activation/deactivation. In other words, in the unpaired spectrum, both of DL and UL may be activated by one DCI. The unpaired spectrum may include one band and may be used for TDD (Time Division Duplex).

As in at least one of the following conditions 1 to 3, in a case that a certain condition is satisfied, at least one of a UL SCell and a DL SCell may be deactivated. In the state that the certain condition is satisfied, the UE may recognize that at least one of corresponding UL SCell and DL SCell is to be activated.

(Condition 1)

In a case that all DL SCells in an SCG (Secondary Cell Group) or a secondary PUCCH group are deactivated, the UE may deactivate all UL SCells in the group, irrespective of whether deactivation is indicated by DCI or a MAC CE and of whether a certain timer expires.

(Condition 2)

In a case that all UL SCells in an SCG or a secondary PUCCH group are deactivated, the UE may deactivate all DL SCells in the group, irrespective of whether deactivation is indicated by DCI or a MAC CE and of whether a certain timer expires.

(Condition 3)

Each DL SCell may be associated with a UL SCell or a PCell. Each UL SCell may be associated with a DL SCell that is a reference for calculation of at least one of path loss and timing, by higher layer signaling (for example, RRC signaling). In a case that DL assignment deactivates a DL SCell that is used as a reference of a UL SCell, the corresponding UL SCell may also be deactivated.

<Self-Carrier Scheduling/Cross-Carrier Scheduling>

As to SCell activation/deactivation, corresponding UE operations may be defined in consideration of at least one of the following cases 1 and 2.

Figure 2:
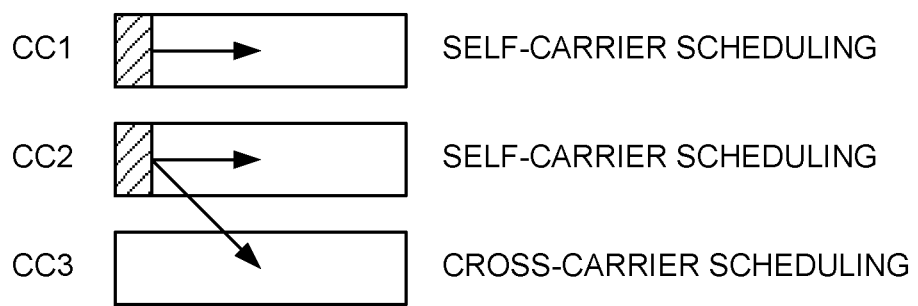
FIG. 2 is a diagram to show an example of self-carrier scheduling and cross-carrier scheduling.

(Case 1) As shown in FIG. 2, self-carrier scheduling may be configured to SCells (CC1 and CC2) by a higher layer. The CC to which self-carrier scheduling is configured (or cross-carrier scheduling is not configured) is scheduled by using DCI in the CC.

(Case 2) As shown in FIG. 2, cross-carrier scheduling may be configured to an SCell (CC3) by a higher layer. The CC to which cross-carrier scheduling is configured is scheduled by using DCI in other CC (for example, CC2).

The CC to which DCI for scheduling is transmitted may be referred to as a "scheduling CC (scheduling cell)." The CC that is scheduled by using DCI may be referred to as a "scheduled CC (scheduled cell)."

(Aspect 1-1)

The case 1 that self-carrier scheduling is configured to an SCell, will be described. The case that self-carrier scheduling is configured to an SCell, represents a case that the PDCCH of the SCell is configured so as to be able to schedule only the PDSCH or the PUSCH in the same SCell, by higher layer signaling. This case may be interpreted as a case that a CIF is not included in the PDCCH of the SCell.

As in the case of existing CA activation, SCell activation/deactivation may be performed by a MAC CE. The SCell activation/deactivation may be indicated to self-carrier scheduling by a MAC CE included in the PDSCH that is transmitted and/or received in other CC. In this case, the UE assumes that activation/deactivation of the SCell is not indicated by DCI. In a case that activation/deactivation of the SCell is to be indicated, the base station performs such indication by using the MAC CE.

The SCell activation/deactivation may be performed by DCI that is transmitted and/or received in a CC different from the CC to which activation/deactivation is to be indicated.

In a case that cross-carrier scheduling is configured in at least one CC in a cell group (or PUCCH group) including the SCell, a CIF (Carrier Indicator Field, cell indicator field) included in the PDCCH (or DCI) of the CC, may be used (or reused) to indicate activation/deactivation of the SCell. In this case, although the UE can assume that the CIF included in the DCI of the CC does not indicate the SCell, for cross-carrier scheduling of the PDSCH or the PUSCH, the UE performs activation/deactivation of the SCell in the case that the CIF indicates the SCell.

In a case that one or more CCs may be configured as scheduling CCs, an SCell which activation/deactivation can be indicated by DCI of the CC, is configured to the UE by higher layer signaling. Alternatively, an SCell which activation/deactivation can be indicated, may not be explicitly configured by signaling, and the UE may assume, in accordance with the value of the CIF, that any SCell included in the same cell group or PUCCH group is to be activated/deactivated by the DCI.

The UE may monitor DCI for indicating SCell activation, in a CC that is configured by higher layer signaling.

The UE may monitor the PDCCH of an activated SCell, after the SCell is activated.

The UE may perform at least one of the following options 1-1 to 1-4.

(Option 1-1)

The activated SCell may be deactivated by certain DCI in a certain CC (for example, CC used for activation, or CC explicitly configured by higher layer signaling). In other words, the UE monitors the certain DCI in the certain CC, and in a case that the DCI indicates deactivation of the SCell, the UE deactivates the SCell in accordance with the indication.

(Option 1-2)

The activated SCell may be deactivated by certain DCI of the activated SCell. In other words, the UE monitors the certain DCI in the activated SCell, and in a case that the DCI indicates deactivation of the SCell, the UE deactivates the SCell in accordance with the indication.

(Option 1-3)

The UE may monitor the DCI for indicating deactivation of the SCell in both of the CCs described in Options 1-1 and 1-2 (for example, the CC used for activation and the activated SCell).

(Option 1-4)

Whereas activation of the SCell is performed by DCI, deactivation may be indicated not by DCI, but by a MAC CE. In other words, the UE may monitor a MAC CE for SCell deactivation. In this case, the DCI may be used for SCell activation.

In the state before SCell activation in FIGS. 3A and 3B, the CC2 and CC3 are activated SCells (active SCells), and the CC1 is a deactivated SCell (inactive SCell).

Self-carrier scheduling is configured to the CC1 and CC2 (cross-carrier scheduling or a CIF is not configured). Cross-carrier scheduling is configured to the CC3 (CC3 can be scheduled by other CC). Here, it is assumed that the CC2 is a scheduling CC and that the CC3 is a scheduled CC.

As shown in FIGS. 3A and 3B, the CC1 may be activated in accordance with a CIF of DCI that is transmitted in the CC2 (cross carrier) different from the CC1.

As shown in FIG. 3A, the CC1 may be deactivated by DCI that is transmitted in the same CC1 (Options 1-2 and 1-3). As shown in FIG. 3B, the CC1 may be deactivated in accordance with a CIF in DCI that is transmitted in the CC2 (cross carrier) different from the CC1. The DCI for deactivation may be transmitted in the CC that is used for activation (Options 1-1 and 1-3).

<Activation/Deactivation Determining Method>

The UE may distinguish between activation DCI and deactivation DCI by at least one of the following modes 1 and 2.

(Mode 1)

The UE may implicitly distinguish whether the DCI is for activation or for deactivation. The UE may distinguish whether the DCI is for activation or for deactivation, based on at least one of the following modes 1-1 and 1-2.

<Mode 1-1>

In a case of detection of DCI for scheduling data on an SCell in deactivated state, the UE activates the SCell.

Figure 4A:
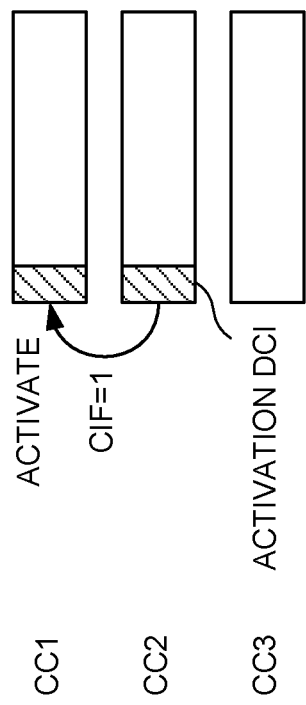

As shown in FIG. 4A, a CIF may be used to indicate which SCell is to be activated. On the other hand, in order to indicate which resource is to be scheduled, other certain field in the DCI (for example, frequency domain resource allocation, time domain resource allocation, MCS (Modulation and Coding Scheme), RV (Redundancy Version), or NDI (New Data Indicator)), may be used.

In other words, in a case that a CIF in DCI having a certain DCI format indicates an inactive SCell and that a certain field in the DCI indicates a data resource, the UE may determine that the DCI indicates activation of the SCell indicated by the CIF.

In a case that the CIF exists in the DCI, the CIF may be used to indicate which SCell is to be deactivated.

In other words, in a case that a CIF in DCI having a certain DCI format indicates an active SCell, the UE may determine that the DCI indicates deactivation of the SCell indicated by the CIF.

In a case that the CIF does not exist in the DCI, in order to inform the UE that the DCI is a notification of deactivation and that the current SCell (SCell that receives the DCI) is to be deactivated, other certain field in the DCI may be set to a certain value.

In other words, in a case that a certain field in DCI having a certain DCI format indicates a certain value, the UE may determine that the DCI indicates deactivation of the SCell that receives the DCI.

<Mode 1-2>

An SCell is activated without data scheduling.

A CIF may be used to indicate which SCell is to be activated/deactivated. On the other hand, activation/deactivation may be distinguished from each other by setting other certain field in the DCI to a certain value. The certain value may be one of a value for indicating activation and a value for indicating deactivation.

In other words, in a case that a certain field in DCI having a certain DCI format shows a certain value, the UE may determine that the DCI indicates activation/deactivation of the SCell indicated by the CIF. The UE may recognize that the DCI indicates activation in a case that the certain field in the DCI has a value for indicating activation, whereas the UE may recognize that the DCI indicates deactivation in a case that the certain field in the DCI has a value for indicating deactivation.

As shown in FIG. 4B, at least one certain field of frequency domain resource allocation, time domain resource allocation, MCS, RV, and NDI may be "all 1" or "1" in activation DCI. As shown in FIG. 4C, at least one certain field of frequency domain resource allocation, time domain resource allocation, MCS, RV, and NDI may be "all 0" or "0" in deactivation DCI.

In the case that the CIF exists in the DCI, the CIF may be used to indicate which SCell is to be deactivated.

In other words, in the case that a CIF in DCI having a certain DCI format indicates an active SCell, the UE may determine that the DCI indicates deactivation of the SCell indicated by the CIF.

In the case that the CIF does not exist in the DCI, in order to inform the UE that the current SCell (SCell that receives the DCI) is to be deactivated, other certain field in the DCI may be set to a certain value.

In other words, in the case that a certain field in DCI having a certain DCI format shows a certain value, the UE may determine that the DCI indicates deactivation of the SCell that receives the DCI.

(Mode 2)

Whether DCI indicates activation or deactivation may be explicitly distinguished by a certain field included in the DCI.

As shown in FIG. 5, in order to indicate the activation or deactivation state of an SCell that is indicated by a CIF, an activation/deactivation indicator field of 1 bit may be introduced in DCI having a certain DCI format.

In a case that the activation/deactivation indicator in the DCI is set to "1," the UE may determine that the SCell indicated by the CIF in the DCI is to be activated. In a case that the activation/deactivation indicator in the DCI is set to "0," the UE may determine that the SCell indicated by the CIF in the DCI is to be deactivated.

The following UE operations may be defined.

<Active BWP Determining Method>

The UE preferably knows which BWP is used as an active BWP, in a case of receiving SCell activation signaling (SCell activation DCI).

The BWP may be referred to as a "bandwidth part," a "partial frequency band," a "partial band," and the like. In NR, it is possible to configure one or a plurality of BWPs per component carrier (CC), for the UE.

Figure 6:
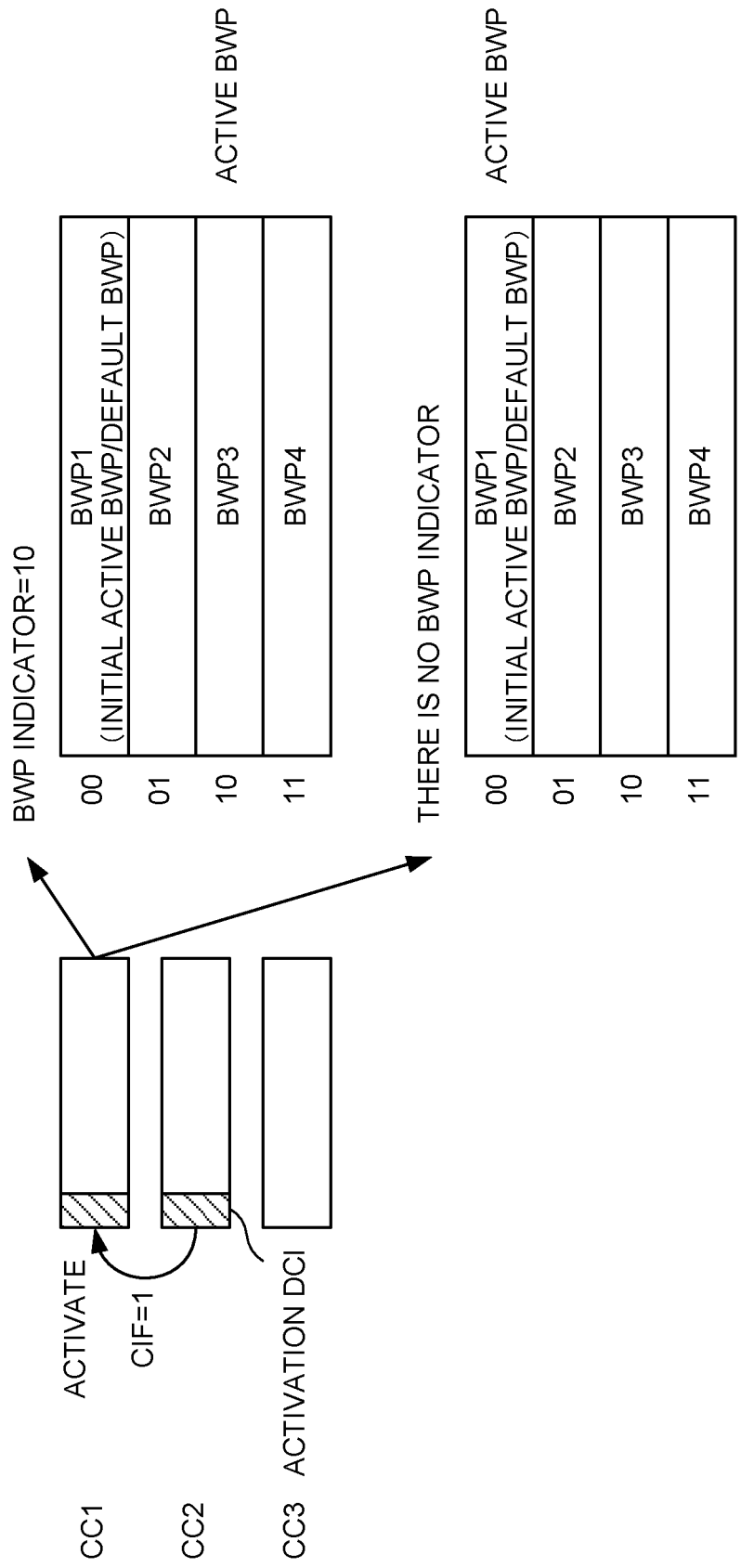
FIG. 6 is a diagram to show an example of a method of determining an active BWP.

As shown in FIG. 6, in a case that a BWP indicator (BandWidth Part indicator, partial band indicator field) is included in activation DCI, at least one BWP belonging to the SCell to be activated, may be indicated to the UE, as an active BWP, by the BWP indicator. For example, the BWP indicator may have 2 bits and may indicate one of four BWPs. The size of the BWP indicator may be other value and may, for example, 1 bit.

As shown in FIG. 6, in a case that the BWP indicator is not included in the activation DCI, the UE may determine that the BWP belonging to the SCell to be activated, is an initial active BWP or a default BWP. In the case that the BWP indicator is not included in the activation DCI, the UE may determine that the BWP belonging to the SCell to be activated, is an active BWP that is configured in advance by a higher layer, or is all active BWPs that are configured in the SCell.

In a case that the UE receives SCell activation signaling (SCell activation DCI), a PDSCH or a PUSCH may be scheduled by using the SCell activation signaling.

This active BWP determining method makes the UE determine SCell activation and an active BWP in accordance with one DCI, whereby the SCell and the BWP can be used at higher speed. Overhead for notifying the SCell activation and the active BWP can be suppressed.

<PDSCH/PUSCH Scheduling Method>

In a case of using SCell activation signaling to schedule a PDSCH or a PUSCH, the UE may use (reuse) the same mechanism as interpretation (reinterpretation) of a DCI field that is defined in BWP switching.

For example, a case is assumed in which the number of bits necessary to allocate a frequency domain resource to an SCell to be activated, is greater than the size of the frequency domain resource allocation field in the received DCI. In this case, frequency domain resource allocation may be performed to the UE by the field, on the case that all of the bits exceeding the frequency domain resource allocation field in the received DCI are zero (that is, all bits insufficient to the number of bits that are necessary to allocate the frequency domain resource to the SCell to be activated, are zero). In this case, allocating the resource to all of the frequency domain resources of the SCell to be activated, is not achieved.

For example, a case is assumed in which the number of bits necessary to allocate a frequency domain resource to an SCell to be activated, is smaller than the size of the frequency domain resource allocation field in the received DCI. In this case, the UE may ignore bits that are upper than the necessary number of bits and may interpret only lower bits equal to the necessary number of bits as frequency domain resource allocation.

The above-described interpretation method can be employed not only in the frequency domain resource allocation field but also in other field, for example, a time domain resource allocation field, an MCS index, an HARQ process number field, a BWP indicator, and a MIMO antenna port index, in a similar manner.

In the case that the UE receives SCell activation signaling (SCell activation DCI), a PDSCH or a PUSCH may not be scheduled by using the SCell activation signaling.

In a case that the PDSCH or the PUSCH is not scheduled by the SCell activation DCI, the UE may distinguish between activation DCI and deactivation DCI in a manner similar to that in the above-described activation/deactivation determining method (Modes 1-2 and 2).

This PDSCH/PUSCH scheduling method makes the UE perform SCell activation and PDSCH/PUSCH scheduling based on one DCI, whereby the SCell activation and the PDSCH/PUSCH scheduling can be performed at higher speed. Overhead for notifying the SCell activation and the PDSCH/PUSCH scheduling can be suppressed.

<CSI Reporting Trigger Method>

In the case that the UE receives SCell activation signaling (SCell activation DCI), CSI reporting may be triggered or may not be triggered in the UE by SCell activation signaling.

Figure 7A:
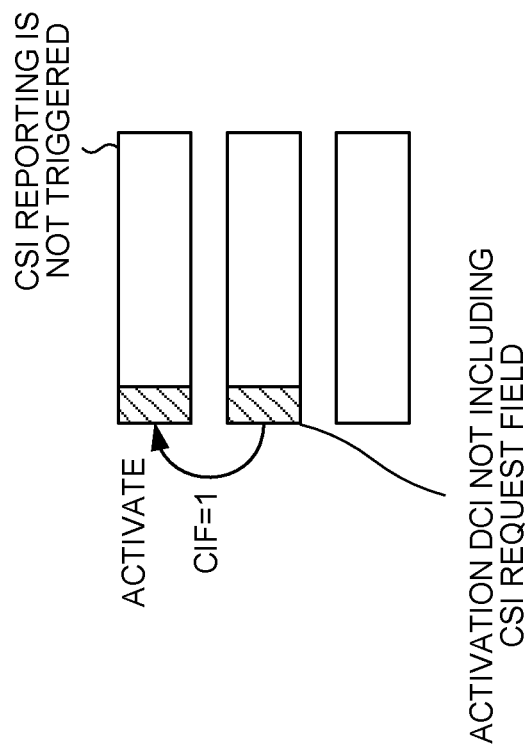
FIGS. 7A and 7B are diagrams to show examples of a method of triggering CSI reporting.

As shown in FIG. 7A, in a case that activation DCI includes a CSI request field, CSI reporting may be triggered in the UE by the activation DCI.

Figure 7B:
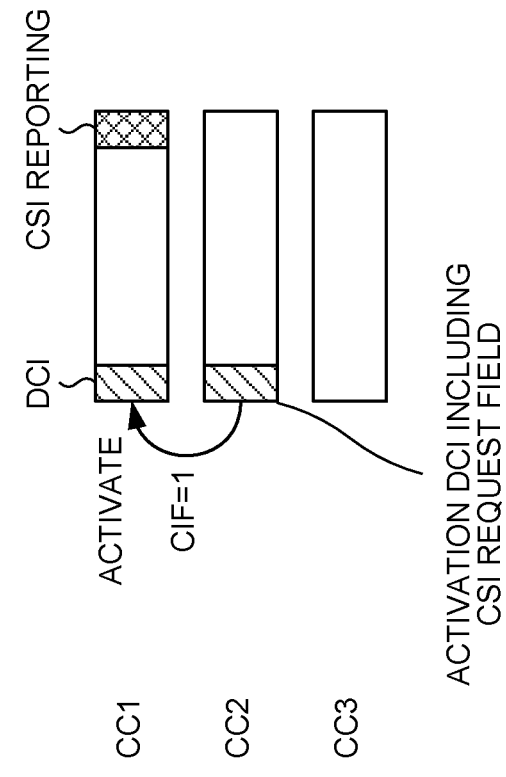

As shown in FIG. 7B, in a case that the activation DCI does not include the CSI request field, CSI reporting may not be triggered in the UE by the activation DCI. The CSI request field may be included in DCI that is different from the activation DCI.

This CSI reporting triggering method makes the UE perform SCell activation and CSI reporting triggering based on DCI, whereby the SCell activation and the CSI reporting triggering can be performed at higher speed.

(Aspect 1-2)

In the case 2 in which cross-carrier scheduling is configured to an SCell, a CIF may be used to indicate which SCell is to be activated/deactivated.

The UE may use one of the following options 2-1 and 2-2 for activation/deactivation.

(Option 2-1)

In a CC in which a higher layer parameter (cif-Presence) indicating existence (TRUE) of a CIF is configured, the CIF may be included in DCI that is transmitted on the CC. The UE may monitor the DCI in the CC for SCell deactivation.

(Option 2-2)

The UE may monitor only DCI in a scheduling cell (scheduling CC) that is configured by a higher layer parameter (schedulingCellId in CrossCarrierSchedulingConfig) and may use the DCI for SCell deactivation.

The UE may use at least one of the activation/deactivation determining method, the active BWP determining method, the PDSCH/PUSCH scheduling method, and the CSI reporting triggering method, which are described above.

The first aspect enables performing SCell activation/deactivation at higher speed, compared with a case of using a MAC CE. Use of an existing DCI format enables suppressing processing load of the UE, compared with a case of using other DCI format or other RNTI.

(Second Aspect)

To indicate SCell activation/deactivation, a new, certain UE-specific DCI format may be introduced.

In each of the paired spectrum and the unpaired spectrum, the certain DCI format may be used for SCell activation/deactivation.

An RNTI (Radio Network Temporary Identifier, for example, C-RNTI) that is used to scramble CRC (Cyclic Redundancy Check) of an existing DCI format, may be used (reused) to scramble CRC of the certain UE-specific DCI format.

The size (payload size) of the certain UE-specific DCI format may be configured to be the same as the size of the existing DCI format. This prevents increase of blind decoding in the UE. Alternatively, the payload size may be configured to the UE by higher layer signaling.

The UE may perform at least one of the following aspects 2-1 to 2-3.

(Aspect 2-1)

In order to indicate the activation or deactivation state of an SCell, an SCell activation/deactivation indicator field may be included in the certain UE-specific DCI format. The UE may determine activation or deactivation of SCell based on the SCell activation/deactivation indicator field in the certain UE-specific DCI format.

Figure 8:
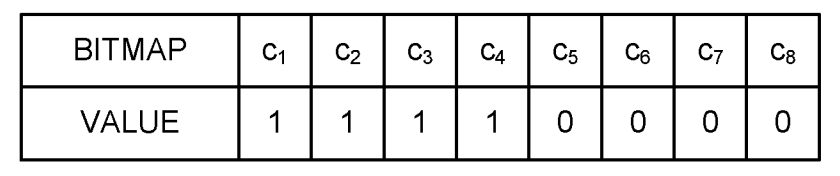

For example, as shown in FIG. 8, the SCell activation/deactivation indicator field may be a $C_i$ field (bitmap). The $c_i$ field may be used to indicate the state of an SCell having an SCell index i. The $c_i$ field may be set to "1" in order to indicate that the SCell having the SCell index i is to be activated. The $C_i$ field may be set to "1" in order to indicate that the SCell having the SCell index i is to be deactivated.

The SCell activation/deactivation indicator field may have the same configuration as an existing SCell activation/deactivation MAC CE.

The UE may determine an active BWP by other commands.

In a case of receiving non-fall back DCI including a BWP indicator, the UE may recognize that the BWP indicated by the BWP indicator is to be activated. This operation may be applied only in a CC in which cross-carrier scheduling is configured.

In a case that the UE does not receive non-fall back DCI, or the UE may receive DCI (non-fall back DCI or fall back DCI) not including the BWP indicator, the UE may recognize that an initial active BWP, a default BWP, or a pre-configured BWP is to be activated. This operation may be applied in both of a CC in which cross-carrier scheduling is configured and a CC in which self-carrier scheduling is configured.

(Aspect 2-2)

In order to indicate the activation or deactivation state of a BWP in an SCell, an SCell activation/deactivation indicator and a BWP indicator may be included in the certain UE-specific DCI format.

As shown in FIG. 9, the BWP indicator may be used to indicate a BWP ID and may be 0, 1, or 2 bits for each CC.

As shown in FIG. 9, the SCell activation/deactivation indicator may be used to indicate the activation or deactivation state of one SCell and may be 1 bit for each CC.

(Aspect 2-3)

In order to indicate activation/deactivation of one or more BWPs in an SCell, a BWP activation/deactivation indicator may be included in the certain UE-specific DCI format.

As shown in FIG. 10, the BWP activation/deactivation indicator may be a bitmap.

In a case that a bitmap value is set to "1," the UE may recognize that a corresponding BWP in a corresponding SCell is to be activated.

In a case that the bitmap value is set to "0," the UE may recognize that a corresponding BWP in a corresponding SCell is to be deactivated.

The second aspect enables performing SCell activation/deactivation at higher speed, compared with a case of using a MAC CE. Making the size of the certain UE-specific DCI format coincide with the size of an existing DCI format, and using an existing RNTI to scramble CRC of the certain UE-specific DCI format, enable suppressing processing load (blind decoding) in the UE.

(Third Aspect)

To indicate SCell activation/deactivation, a new, certain group-common DCI format (transmitted on a group-common PDCCH) may be introduced.

A new certain RNTI may be introduced to be used in scrambling CRC of the certain group-common DCI format. The certain RNTI may be different from an existing certain RNTI (for example, C-RNTI). The certain RNTI may be referred to as an "SCell RNTI," an "activation/deactivation RNTI," and so on. The certain RNTI may be configured by a higher layer parameter that is different from a higher layer parameter for configuring a C-RNTI.

The size of the certain group-common DCI format may be configured to be the same as the size of the existing DCI format. This prevents increase of blind decoding in the UE.

The UE may perform at least one of the following aspects 3-1 to 3-3.

(Aspect 3-1)

In order to indicate the activation or deactivation state of an SCell, an SCell activation/deactivation indicator field in the certain group-common DCI format may be configured to each UE.

Figure 11:
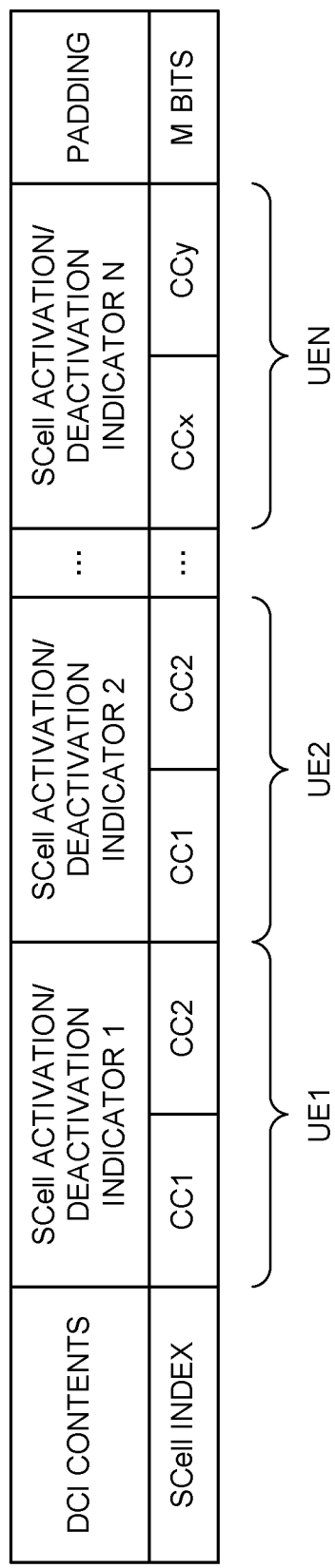
FIG. 11 is a diagram to show an example of an SCell activation/deactivation indicator field according to an aspect 3-1.

As shown in FIG. 11, in order to indicate the activation or deactivation state of an SCell to different UEs, different SCell activation/deactivation indicator fields in the certain group-common DCI format may be used.

The UE may determine activation or deactivation of a SCell based on the corresponding SCell activation/deactivation indicator field in the certain group-common DCI format.

The activation or deactivation states of SCells with respect to different UEs may be different from each other in the same CCs.

The certain group-common DCI format may include padding of M bits as necessary.

(Aspect 3-2)

In order to indicate the activation or deactivation state of a BWP in an SCell, an SCell activation/deactivation indicator including a BWP indicator and a state indicator may be configured to each UE.

Figure 12:
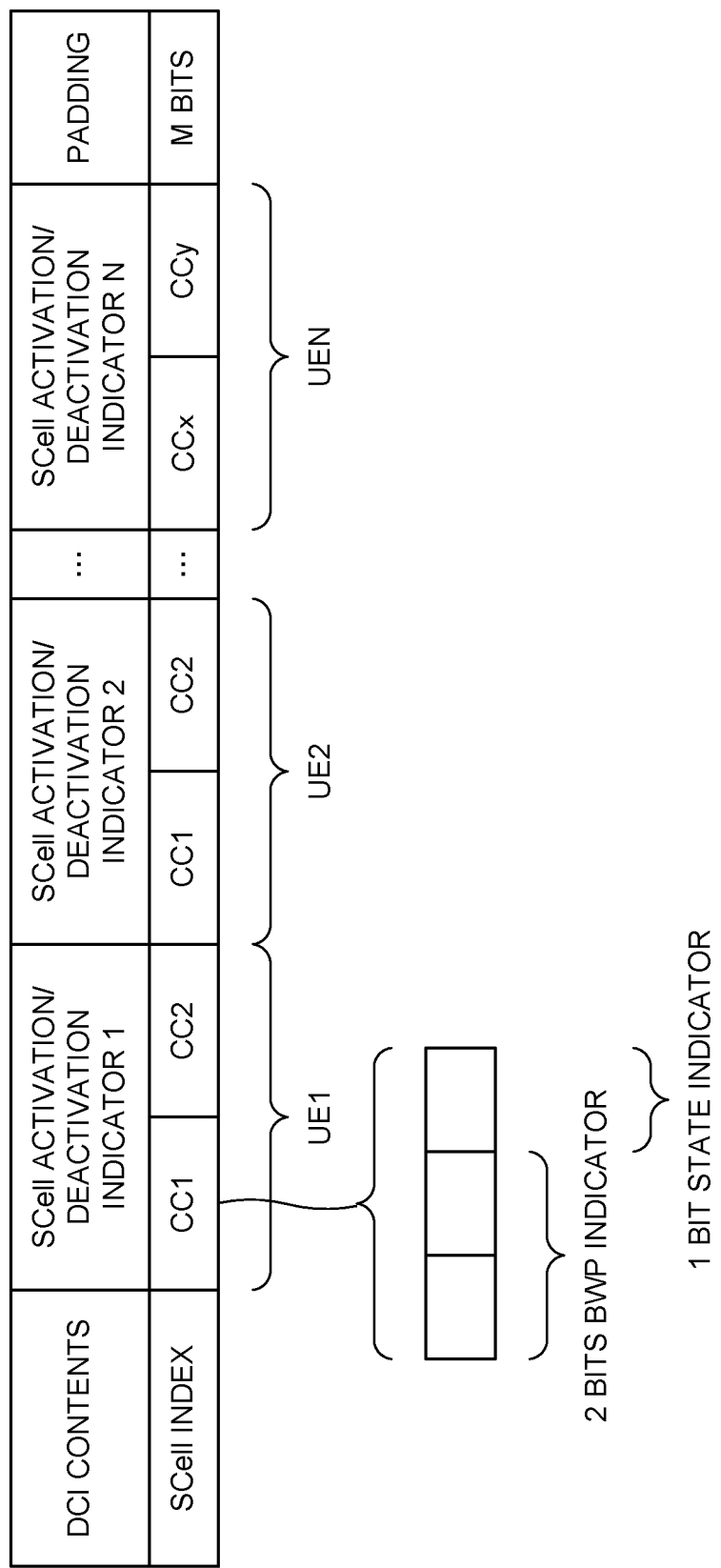
FIG. 12 is a diagram to show an example of an SCell activation/deactivation indicator field according to an aspect 3-2.

As shown in FIG. 12, in order to indicate the activation or deactivation state of a BWP in an SCell to different UEs, different SCell activation/deactivation indicator fields in the certain group-common DCI format may be used.

For example, the SCell activation/deactivation indicator field may include a BWP indicator of 2 bits and a state indicator of 1 bit, for one BWP in one SCell of one UE. The size of the BWP indicator may be other value and may be, for example, 1 bit.

The activation or deactivation states of BWPs in SCells with respect to different UEs may be different from each other in the same CCs.

The certain group-common DCI format may include padding of M bits as necessary.

(Aspect 3-3)

In order to indicate the activation or deactivation states of all BWPs in an SCell, an SCell activation/deactivation indicator field in the certain group-common DCI format may be configured to each UE and to each of the BWPs.

Figure 13:
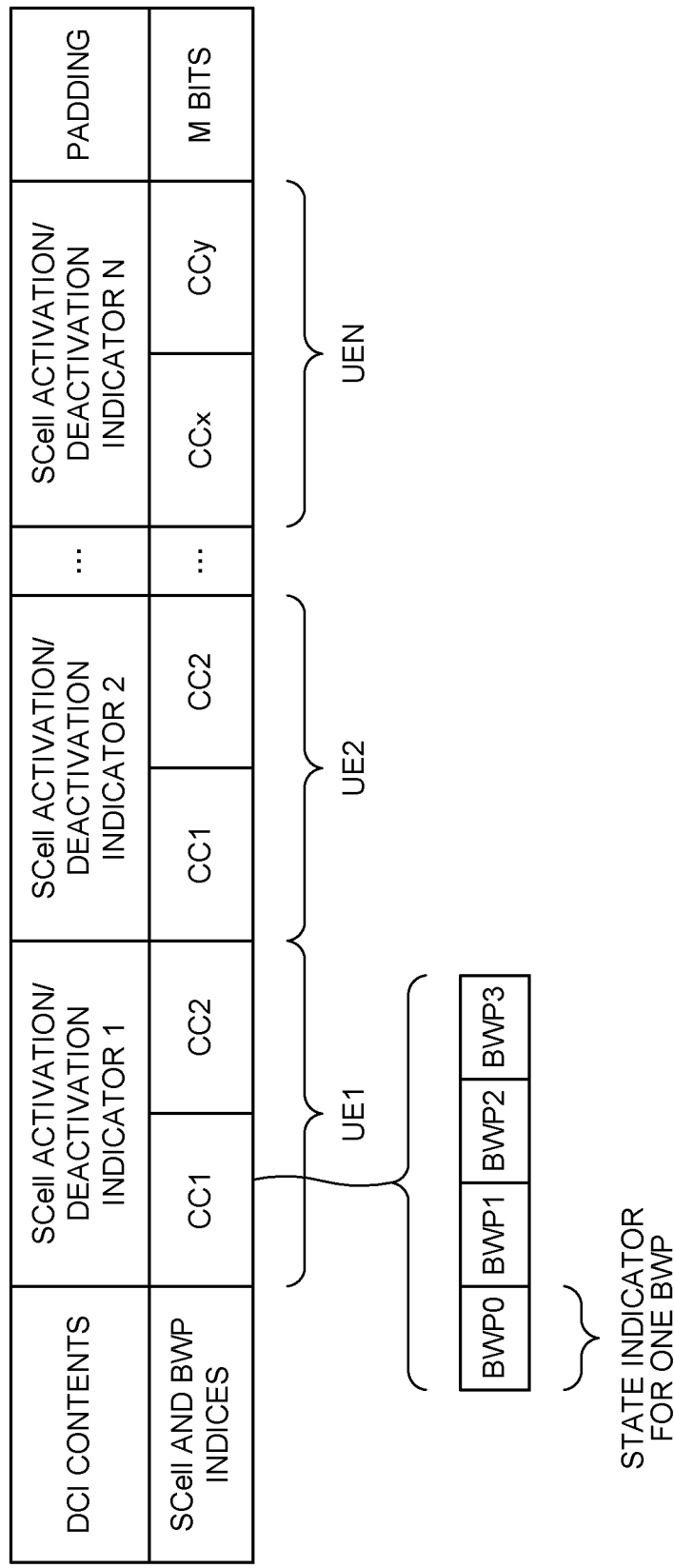
FIG. 13 is a diagram to show an example of an SCell activation/deactivation indicator field according to an aspect 3-3.

As shown in FIG. 13, in order to indicate the activation or deactivation states of BWPs in SCells to different UEs, different SCell activation/deactivation indicator fields in the certain group-common DCI format may be used.

For example, the SCell activation/deactivation indicator field may include a state indicator of 1 bit, for each UE, for each SCell (CC), and for each BWP.

The activation or deactivation states of BWPs in SCells with respect to different UEs may be different from each other in the same CCs.

The certain group-common DCI format may include padding of M bits as necessary.

On the other hand, in a case that the certain group-common DCI format is not detected, the UE may maintain the activation/deactivation state for each SCell. In other words, the active SCell is still active, and the deactive SCell is still deactive. In this case, counting of an SCell deactivation timer for the active SCell can also be continued.

The third aspect enables performing SCell activation/deactivation at higher speed, compared with a case of using a MAC CE. Making the size of the certain group-common DCI format coincide with the size of an existing DCI format, enables suppressing processing load (blind decoding) in the UE.

(Fourth Aspect)

Timing of SCell activation/deactivation based on DCI may be defined in the first to the third aspects.

Each of the following aspects 4-1 and 4-2 may be used.

(Aspect 4-1)

Fixed timing for SCell activation may be defined. This may also apply to each of the first to the third aspects.

When the UE receives activation DCI for SCell at a slot n, a corresponding operation among the above-described operations 1-1 to 1-5, except for the following operations 2-1 to 2-3, may be applied before a slot n+M and after certain timing (for example, slot n+k of the cell in which the activation command for SCell is received, the SCell to be activated, or the cell for performing CSI reporting).

(Operation 2-1) Operation relating to CSI reporting to a serving cell, which is activated at certain timing (for example, slot n+k of the cell in which the activation command for SCell is received, the SCell to be activated, or the cell for performing CSI reporting).

(Operation 2-2) Operation relating to SCell deactivation timer (sCellDeactivationTimer) associated with an SCell that is activated at certain timing (for example, slot n+k of the cell in which the activation command for SCell is received, the SCell to be activated, or the cell for performing CSI reporting).

(Operation 2-3) Operation relating to CSI reporting to a serving cell that is not active at certain timing (for example, slot n+k of the cell in which the activation command for SCell is received, the SCell to be activated, or the cell for performing CSI reporting).

The operations 2-1 and 2-2 can be applied, for example, at the certain timing (for example, slot n+k of the cell in which the activation command for SCell is received, the SCell to be activated, or the cell for performing CSI reporting). The operation 2-3 can be applied at a first slot after the certain timing (for example, slot n+k of the cell in which the activation command for SCell is received, the SCell to be activated, or the cell for performing CSI reporting).

When the UE receives deactivation DCI for SCell or an SCell deactivation timer associated with the SCell expires, at a slot n, a corresponding operation among the above-described operations 1-1 to 1-5, except for the operation 2-1, may be applied before a slot n+M that is the minimum requirement.

Figure 14A:
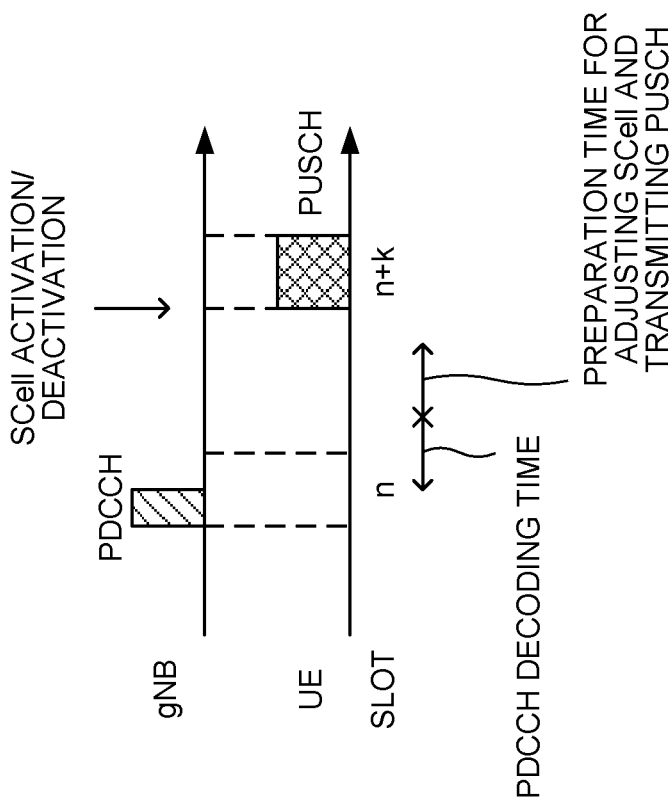
FIGS. 14A and 14B are diagrams to show examples of SCell activation timing according to an aspect 4-1.

As shown in FIG. 14A, in SCell activation without data scheduling, "k" may satisfy a PDCCH processing time and a preparation time for adjusting the SCell.

Figure 14B:
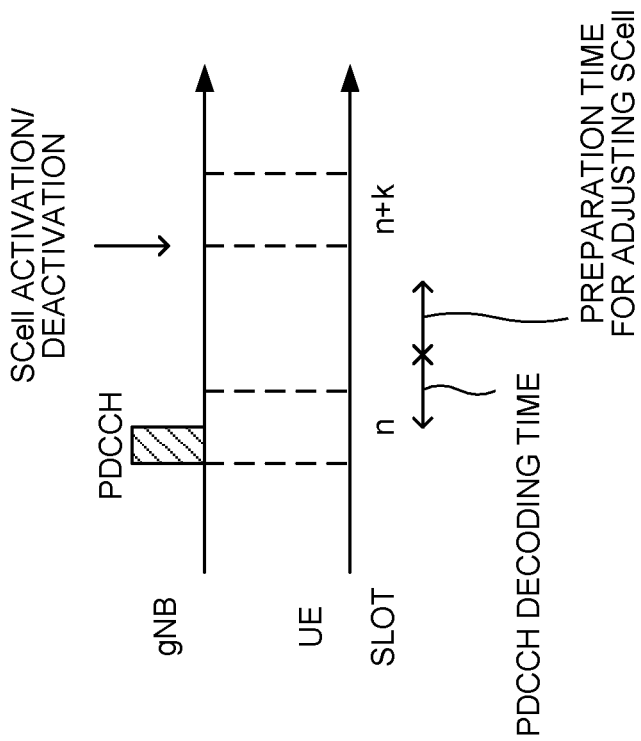

As shown in FIG. 14B, in SCell activation with data scheduling, "k" may satisfy a PDCCH processing time, a preparation time for adjusting the SCell, and a preparation time for receiving a PDSCH or transmitting a PUSCH.

The timing from the SCell activation DCI to the SCell activation may be similar to the timing in a case of an existing SCell activation MAC CE.

(Aspect 4-2)

Fixed timing for SCell activation may be dynamically indicated by DCI. This may also apply to the first aspect.

For example, in order to indicate start timing of SCell activation, a time domain resource allocation field in activation DCI (DL assignment or UL grant) may be used (reused).

Figure 15A:
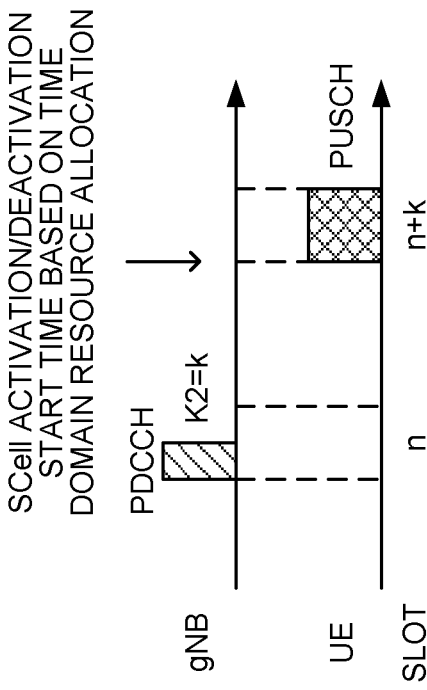
FIGS. 15A and 15B are diagrams to show examples of SCell activation timing according to an aspect 4-2.

As shown in FIG. 15A, the UE may determine the start timing (slot n+k) of SCell activation based on a slot offset $K_0$ (=k) that is indicated by a time domain resource allocation field (start and length indicator value (SLIV)) in DL assignment (slot n) for indicating the SCell activation.

Figure 15B:
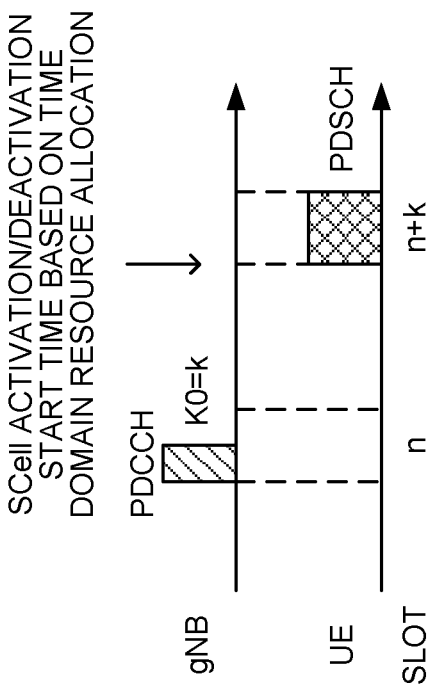

As shown in FIG. 15B, the UE may determine the start timing (slot n+k) of SCell activation based on a slot offset $K_2$ (=k) that is indicated by a time domain resource allocation field (SLIV) in UL grant (slot n) for indicating the SCell activation.

The fourth aspect enables the UE and the base station to match the time from the DCI to SCell activation/deactivation, whereby transmission and reception in the SCell can be appropriately performed.

(Fifth Aspect)

An SCell state (sCellState) may be introduced at the same time as configuration of the SCell, as higher layer signaling (RRC signaling) for indicating that the SCell can be activated.

In a case that the SCell state is configured to each SCell that is configured to a UE other than a PSCell, and that the SCell state shows "active (activated)," the UE may configure a lower layer in such a manner that the lower layer recognizes that the SCell is an activated state. Otherwise, in a case that the SCell state is configured to the SCell and shows "inactive (inactivate)," the UE may configure a lower layer in such a manner that the lower layer recognizes that the SCell is in an inactive state. In other cases, the UE may configure a lower layer in such a manner that the lower layer recognizes that the SCell is a deactivated state.

Here, the state in which the SCell is explicitly activated simultaneously as configuration is referred to as an "activated state," the state in which the SCell is explicitly inactivated simultaneously as configuration is referred to as an "inactive state," and the state in which the SCell is implicitly deactivated simultaneously as configuration is referred to as a "deactivated state."

In this aspect, activation is configured by the higher layer signaling, whereby overhead of the DCI can be suppressed.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 16:
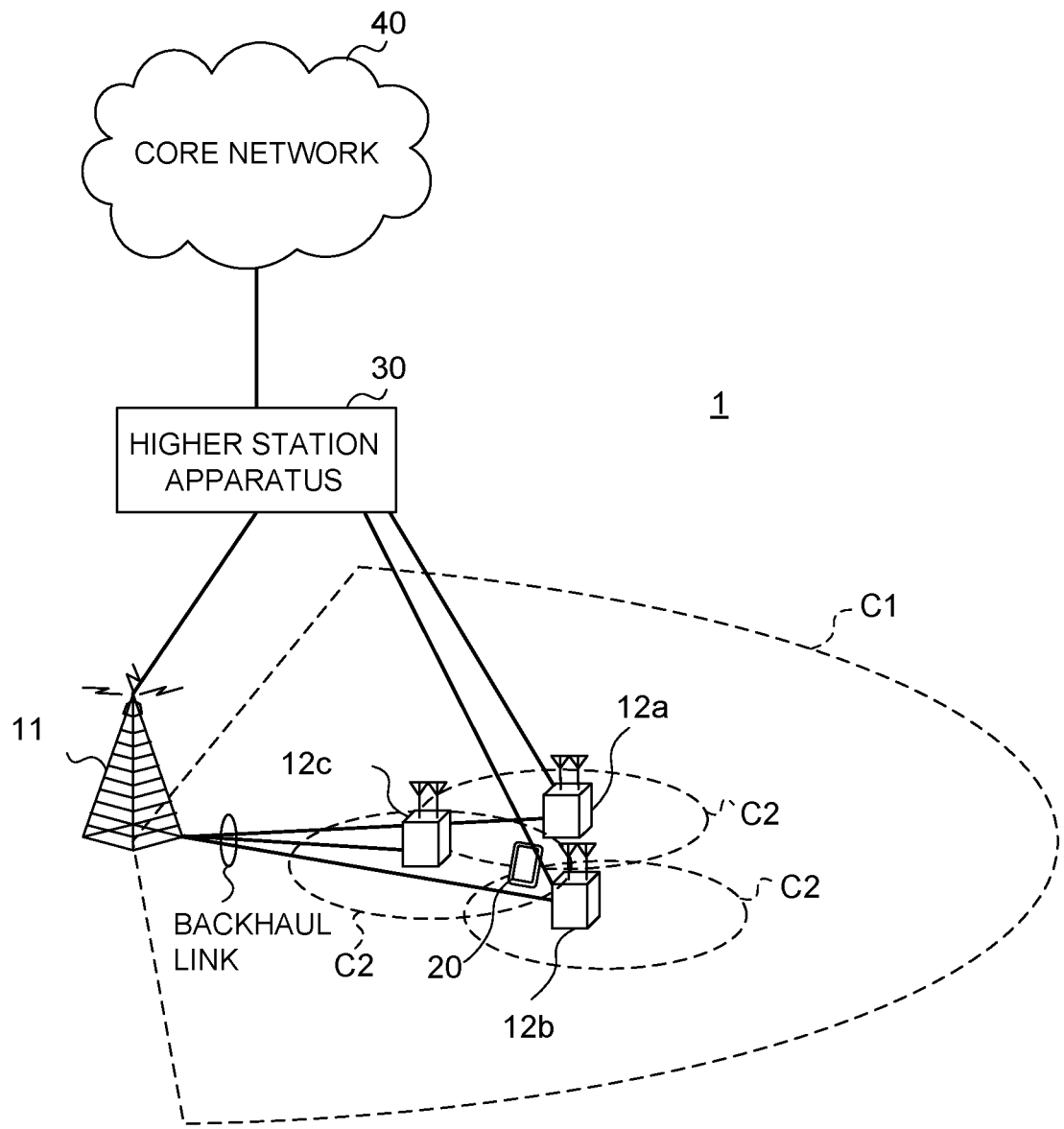
FIG. 16 is a diagram to show an example of a schematic structure of a radio communication system according to one embodiment.

FIG. 16 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a base station 11 that forms a macro cell C1 of a relatively wide coverage, and base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the base station 11 and the base stations 12. It is assumed that the user terminals 20 use the macro cell C1 and the small cells C2 at the same time by means of CA or DC. The user terminals 20 can execute CA or DC by using a plurality of cells (CCs) (for example, 5 or less of CCs or 6 or more of CCs).

Between the user terminals 20 and the base station 11, communication can be carried out by using a carrier of a relatively low frequency band (for example, 2 GHZ) and a narrow bandwidth (referred to as, for example, an "existing carrier," a "legacy carrier" and so on). Meanwhile, between the user terminals 20 and the base stations 12, a carrier of a relatively high frequency band (for example, 3.5 GHZ, 5 GHZ, and so on) and a wide bandwidth may be used, or the same carrier as that used between the user terminals 20 and the base station 11 may be used. Note that the structure of the frequency band for use in each base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber or an X2 interface) or a wireless connection may be established between the base station 11 and the base stations 12 (or between two base stations 12).

The base station 11 and the base stations 12 are each connected with a higher station apparatus 30 and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each base station 12 may be connected with the higher station apparatus 30 via the base station 11.

Note that the base station 11 is a base station having a relatively wide coverage and may be referred to as a "macro base station," a "central node," an "eNB (eNodeB)," a "transmitting/receiving point," and so on. The base stations 12 are base stations having local coverages and may be referred to as "small base stations," "micro base stations," "pico base stations," "femto base stations," "HeNBs (Home eNodeBs)," "RRHs (Remote Radio Heads)," "transmitting/receiving points," and so on. Hereinafter, the base stations 11 and 12 will be collectively referred to as "base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. The DCI for scheduling reception of DL data (for example, PDSCH) and/or measurement of DL reference signals may be referred to as "DL assignment," "DL grant," "DL DCI," and the like. The DCI for scheduling transmission of UL data (for example, PUSCH) and/or transmission of UL sounding (measurement) signals may be referred to as "UL grant," "UL DCI," and the like.

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Base Station)

Figure 17:
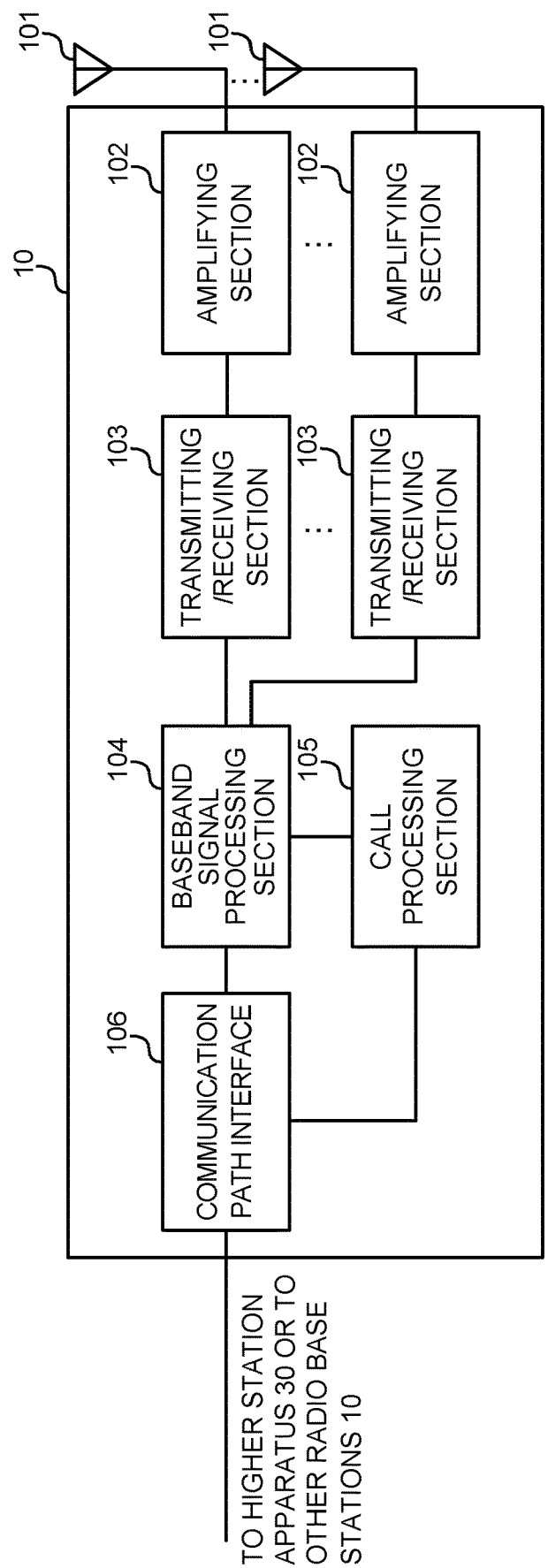
FIG. 17 is a diagram to show an example of an overall structure of a base station according to one embodiment.

FIG. 17 is a diagram to show an example of an overall structure of a base station according to one embodiment. A base station 10 includes a plurality of transmitting/receiving antennas 101, amplifying sections 102, transmitting/receiving sections 103, a baseband signal processing section 104, a call processing section 105, and a communication path interface 106. Note that the base station 10 may be configured to include one or more transmitting/receiving antennas 101, one or more amplifying sections 102 and one or more transmitting/receiving sections 103.

User data to be transmitted from the base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing, and so on) for communication channels, manages the state of the base station 10, manages the radio resources, and so on.

The communication path interface 106 transmits and/or receives signals to and/or from the higher station apparatus 30 via a certain interface. The communication path interface 106 may transmit and/or receive signals (backhaul signaling) with other base stations 10 via an inter-base station interface (for example, an optical fiber in compliance with the CPRI (Common Public Radio Interface) and an X2 interface).

The transmitting/receiving section 103 may transmit downlink control information that uses a certain downlink control information format.

Figure 18:
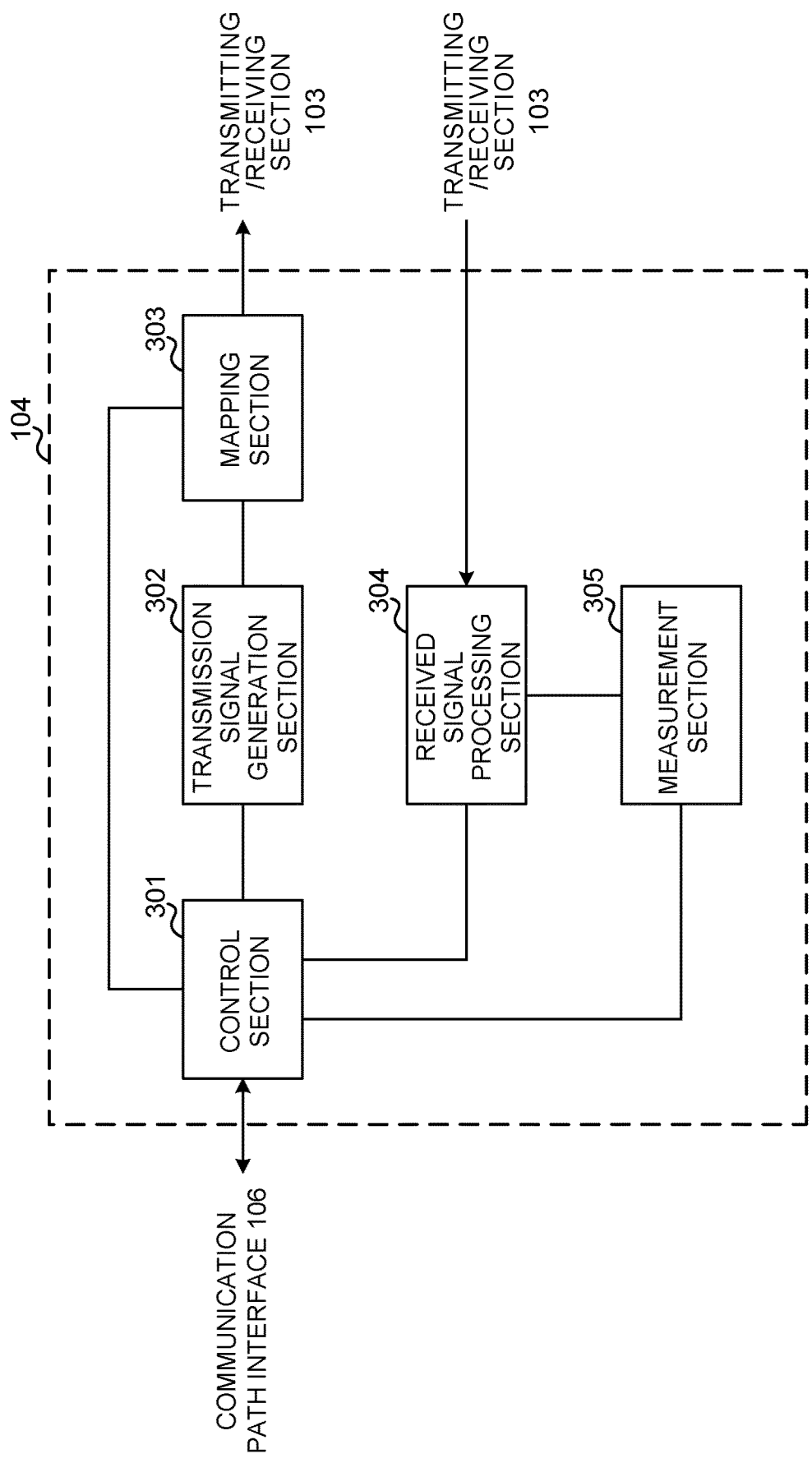
FIG. 18 is a diagram to show an example of a functional structure of the base station according to one embodiment.

FIG. 18 is a diagram to show an example of a functional structure of the base station according to one embodiment of the present disclosure. Note that, the present example primarily shows functional blocks that pertain to characteristic parts of the present embodiment, and it is assumed that the base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the base station 10, and some or all of the structures do not need to be included in the baseband signal processing section 104.

The control section (scheduler) 301 controls the whole of the base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Transmission confirmation information, and so on), a random access preamble (for example, a signal transmitted on the PRACH), an uplink reference signal, and so on.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

The control section 301 may determine activation or deactivation of a secondary cell, based on the downlink control information.

(User Terminal)

Figure 19:
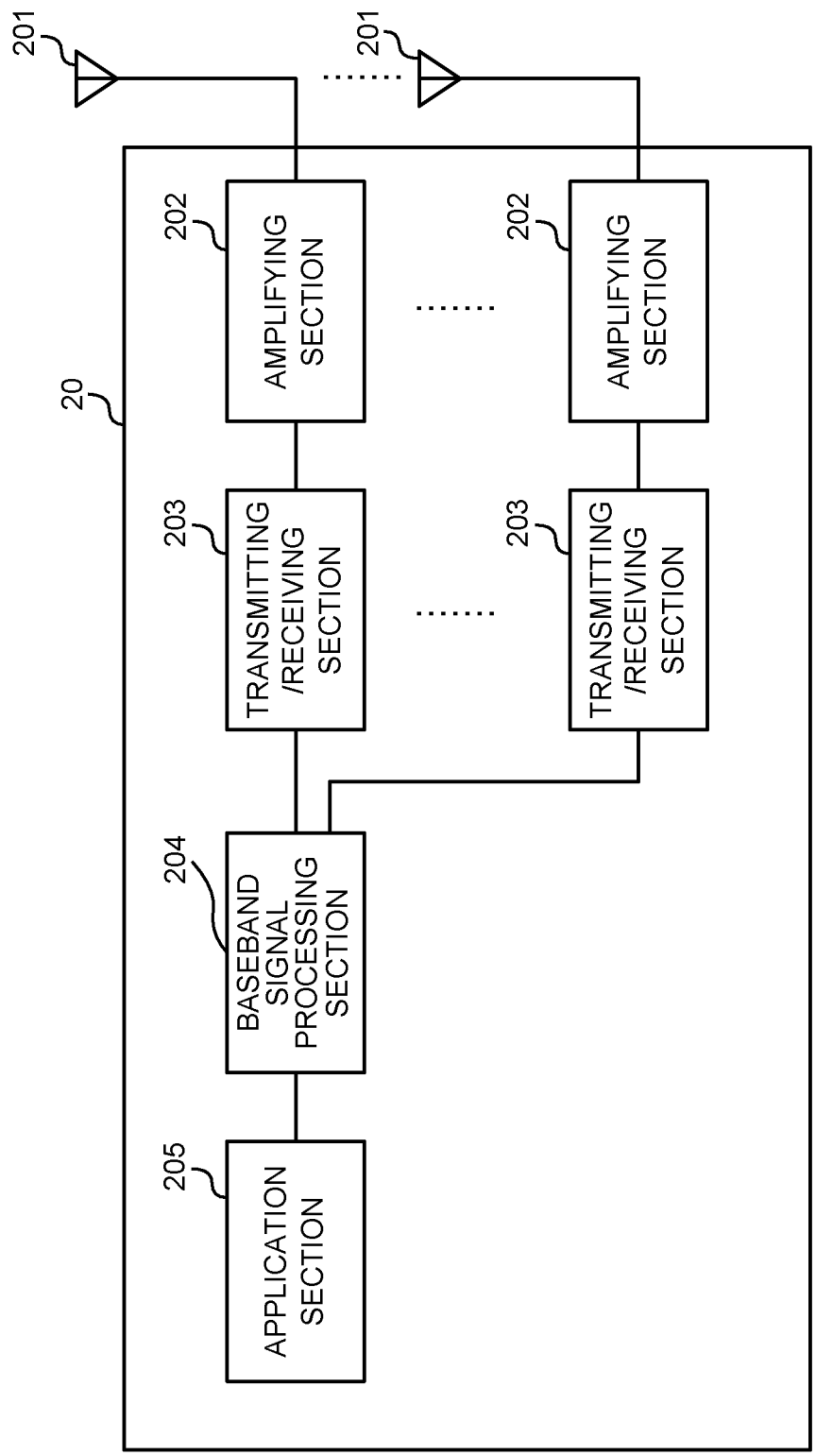
FIG. 19 is a diagram to show an example of an overall structure of a user terminal according to one embodiment.

FIG. 19 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving section 203 may receive downlink control information that uses a certain downlink control information format.

Figure 20:
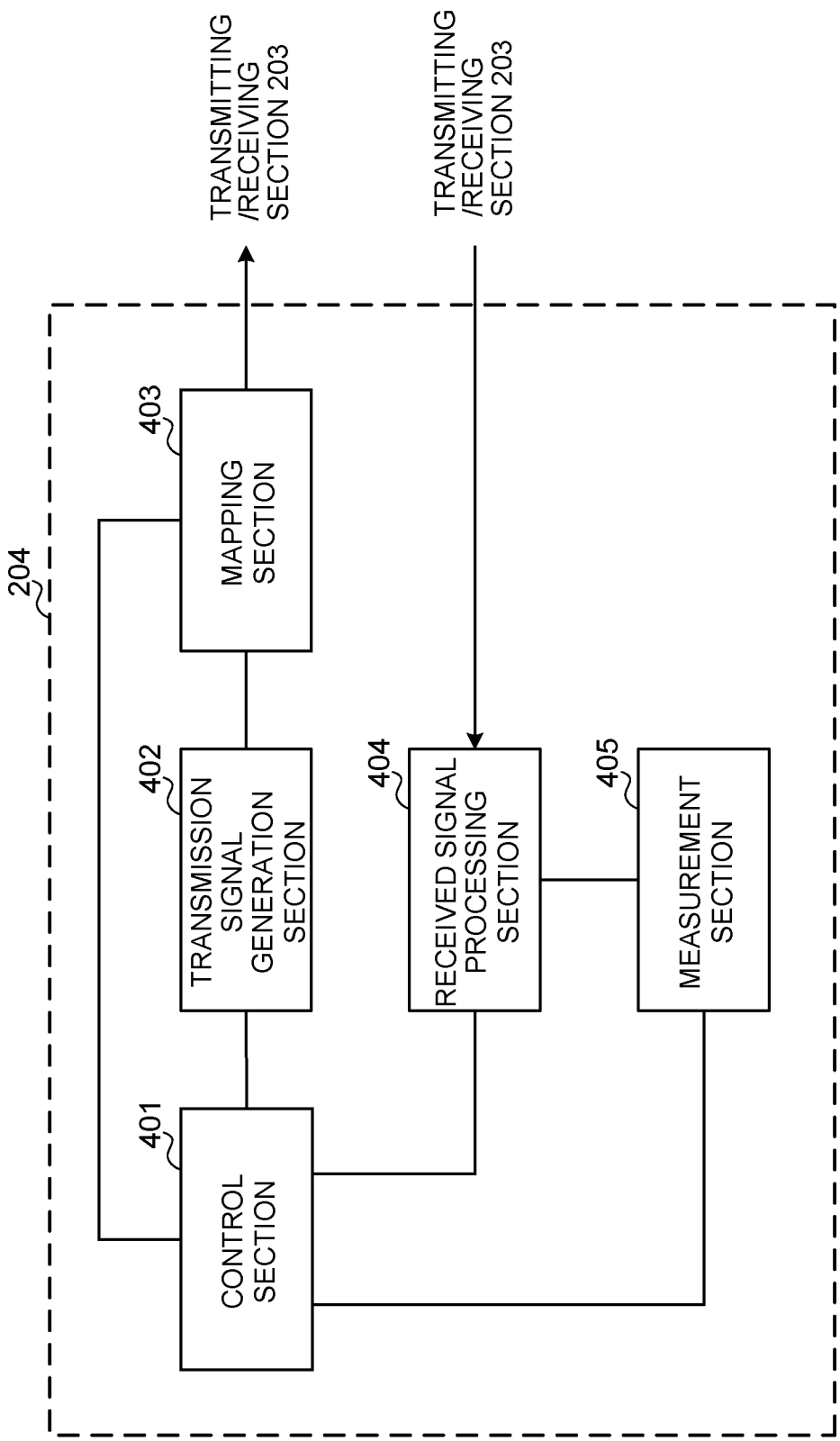
FIG. 20 is a diagram to show an example of a functional structure of the user terminal according to one embodiment.

FIG. 20 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the base station 10, from the received signal processing section 404. The control section 401 controls generation of an uplink control signal and/or an uplink data signal, based on the results of determining necessity or not of retransmission control to a downlink control signal and/or a downlink data signal.

In a case of acquiring a variety of information reported by the base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the base station 10 (downlink control signals, downlink data signals, downlink reference signals, and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, and SNR), a signal strength (for example, RSSI), channel information (for example, CSI), and so on. The measurement results may be output to the control section 401.

The control section 401 may determine activation or deactivation of a secondary cell, based on the downlink control information.

The control section 401 may activate or deactivate the secondary cell, based on at least one field of the frequency resource allocation field, the time resource allocation field, the cell indicator field, and the partial band indicator field, in the downlink control information.

The downlink control information may include at least one of a field that indicates activation or deactivation of the secondary cell and a field that indicates activation or deactivation of the partial band (BWP) (for example, an SCell activation/deactivation indicator field and a state field).

The control section 401 may determine an active partial band (active BWP) based on the downlink control information in a case that activation of the secondary cell is determined.

The control section 401 may determine timing of activation or deactivation of the secondary cell based on the downlink control information.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 21:
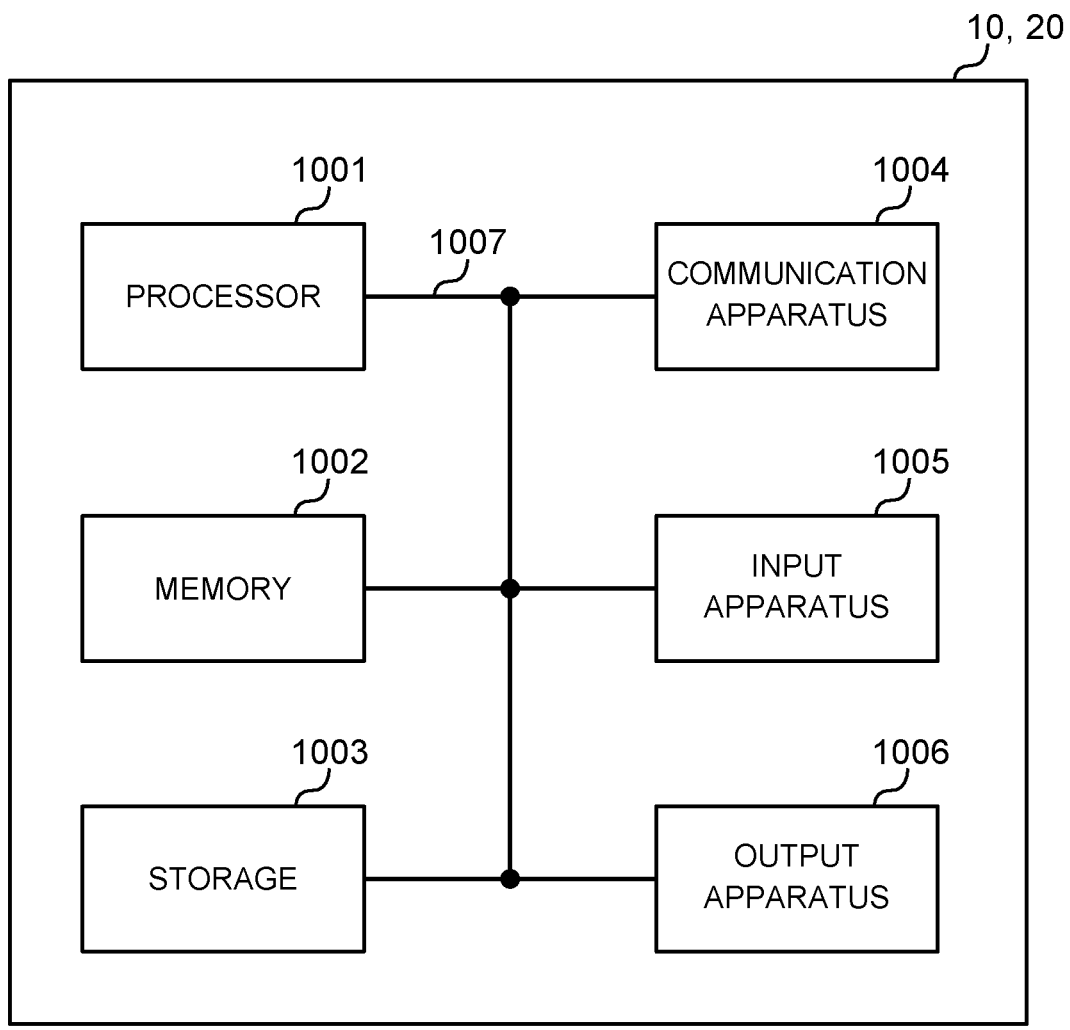
FIG. 21 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 21 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004. In the transmitting/receiving section 103, the transmitting section 103*a* and the receiving section 103*b* can be implemented in a physically or logically separated manner.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced by "signals (signaling)." Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot," and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as "precoding," a "precoder," a "weight (precoding wait)," "quasi-co-location (QCL)," a "transmit power," "phase rotation," an "antenna port," an "antenna port group," a "layer," "the number of layers," a "rank," a "beam," a "beam width," a "beam angular degree," an "antenna," an "antenna element," and a "panel" can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a receiver that receives downlink control information using a certain downlink control information format; and
    a processor that determines activation or deactivation of a secondary cell based on a frequency resource allocation field value in the downlink control information,
    wherein the processor determines timing of activation or deactivation of the secondary cell based on the downlink control information,
    the downlink control information includes a time resource allocation field, and
    the processor determines the timing of activation or deactivation of the secondary cell based on a slot offset that is indicated by the time resource allocation field in the downlink control information.

2. The terminal according to claim 1, wherein the downlink control information includes at least one of a field that indicates activation or deactivation of the secondary cell and a field that indicates activation or deactivation of a bandwidth part (BWP).

3. The terminal according to claim 1, wherein the processor determines an active bandwidth part (BWP) based on the downlink control information in a case that activation of the secondary cell is determined.

4. The terminal according to claim 2, wherein the processor determines an active BWP based on the downlink control information in a case that activation of the secondary cell is determined.

5. A base station comprising:
    a transmitter that transmits downlink control information using a downlink control information format to a terminal; and
    a processor that controls a frequency resource allocation field value in the downlink control information in order for the terminal to determine activation or deactivation of a secondary cell,
    wherein the processor controls the downlink control information in order for the terminal to determine timing of activation or deactivation of the secondary cell based on the downlink control information,
    the downlink control information includes a time resource allocation field,
    the processor controls the timing of activation or deactivation of the secondary cell based on a slot offset, and
    the time resource allocation field in the downlink control information indicates the slot offset.

6. A system comprising a terminal and a base station, wherein
    the terminal comprises:
        a receiver that receives downlink control information using a certain downlink control information format; and
        a processor that determines activation or deactivation of a secondary cell based on a frequency resource allocation field value in the downlink control information,
        wherein the processor determines timing of activation or deactivation of the secondary cell based on the downlink control information,
        the downlink control information includes a time resource allocation field, and
        the processor determines the timing of activation or deactivation of the secondary cell based on a slot offset that is indicated by the time resource allocation field in the downlink control information, and
    the base station comprises:
        a transmitter that transmits the downlink control information.

* * * * *